L. N. LARSON.
ANIMAL TRAP.
APPLICATION FILED JAN. 14, 1910.
983,910.
Patented Feb. 14, 1911.
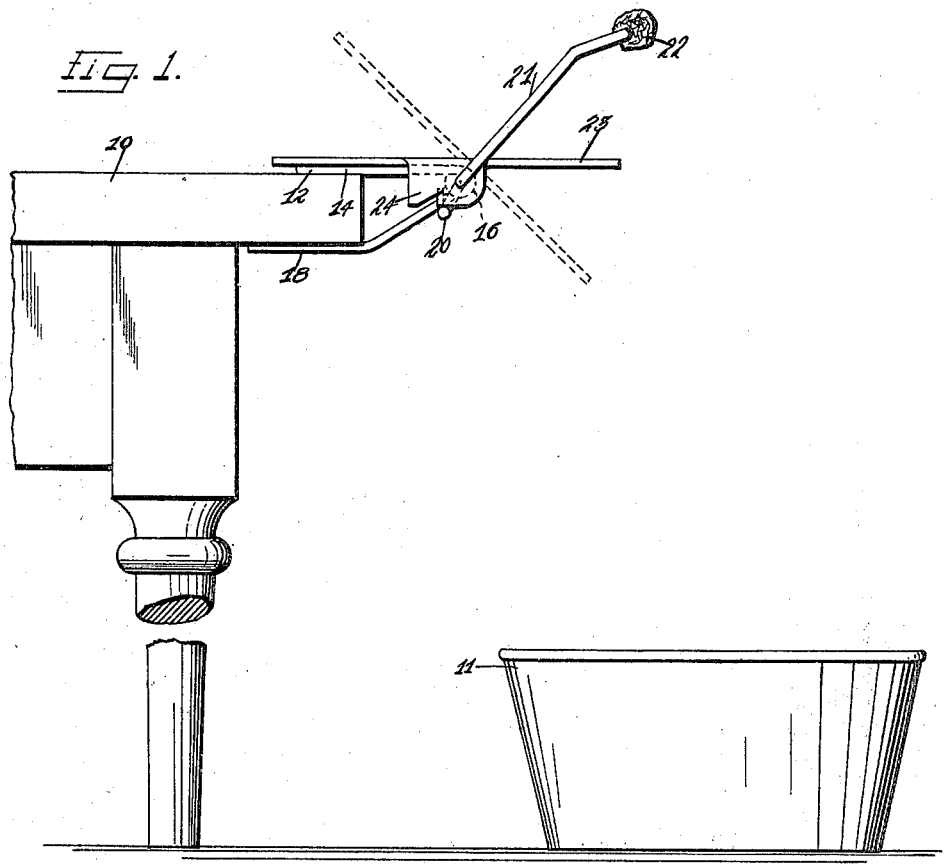
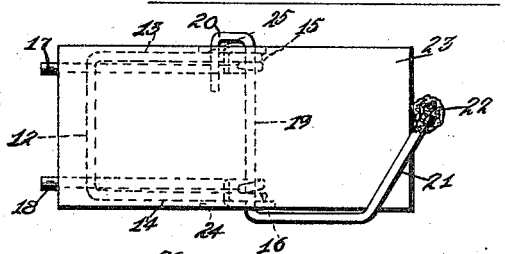
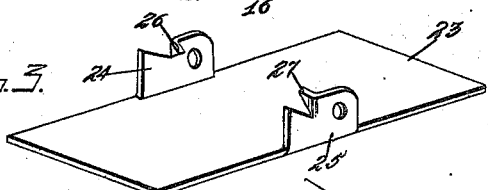
Witnesses
J. E. Strobel.
C. N. Woodward.
Inventor
Louis N. Larson.
By Chandler & Chandler
Attorneys

UNITED STATES PATENT OFFICE.

LOUIS N. LARSON, OF HIGHLAND TOWNSHIP, WINNESHIEK COUNTY, IOWA.

ANIMAL-TRAP.

983,910.   Specification of Letters Patent.   Patented Feb. 14, 1911.

Application filed January 14, 1910. Serial No. 538,064.

*To all whom it may concern:*

Be it known that I, LOUIS N. LARSON, a citizen of the United States, residing in Highland township, in the county of Winneshiek, State of Iowa, have invented certain new and useful Improvements in Animal-Traps; and I do hereby declare the following to be a full, clear, and exact description of the invention, such as will enable others skilled in the art to which it appertains to make and use the same.

This invention relates to animal traps, more particularly to devices of this character for catching or trapping mice and similar small animals, and has for one of its objects to provide a simply constructed device which is self-setting, so that it can be repeatedly used without renewing the bait.
With this and other objects in view, the invention consists in certain novel features of construction as hereinafter shown and described and then specifically pointed out in the claims; and, in the drawings illustrative of the preferred embodiment of the invention, Figure 1 is a side elevation of the improved device applied, Fig. 2 is a plan view of the same, Fig. 3 is an inverted perspective view of the platform portion of the improved trap.

The improved trap is designed to be supported upon the edge of a table or other support above a vessel containing water or other liquid, and into which the animal is caused to plunge when an attempt is made to take the bait. The trap may be connected to any suitable support, but for the purpose of illustration is shown attached to a conventional table as shown at 10 and the vessel containing the water and into which the animal is plunged is represented at 11, and located upon the floor upon which the table rests and in proper position to receive the animal from the trap.
The trap device is constructed of three parts only, a supporting frame, a tilting platform, and a bait holding arm. The supporting frame is formed from a single piece of wire bent into U-shape whereby a bight portion 12 and spaced sides 13—14 are formed. The sides 13—14 are formed intermediate their ends into coils 15—16 and the remaining portions of the sides bent toward the bight portion 12 and spaced therefrom as shown at 17—18. The frame thus constructed is formed with sides or resilient members spaced apart with the coils 15—16 forming springs to maintain the sides 13—14 and the terminals 17—18 yieldably in spaced relations. By this means the frame is adapted to be supported upon the edge of the table top 10 as shown in Fig. 1 with sufficient force to maintain the trap mechanism in position, while at the same time the frame may be readily detached when required.

Extending through the coils 15—16 which thus form bearings therefor is a wire member 19, one end of the wire being bent parallel to itself as shown at 20 and extending beneath the frame wire and bent upwardly at the other end and thence inwardly to form an arm 21 to support the bait 22. By this means the bait is supported at some distance above the frame and in advance of the same, as shown.

The tilting platform portion of the improved device comprises a sheet metal plate 23 having perforated ears 24—25 depending therefrom at the sides and through which the wire 19 extends. By this means the plate 23 is mounted to swing upon the wire 19. The ears 24—25 are located nearer one end of the plate than the other so that the longer end of the plate will be slightly heavier than the shorter end, and will thus be retained in horizontal position with the longer end resting upon the bight portion 12 of the frame as shown in full lines in Fig. 1, but will be free to be tilted into the position shown by dotted lines in Fig. 1 by the weight of the mouse or other animal in attempting to reach the bait 22, as hereinafter explained. The ear 24 is provided with an inwardly directed offset 26 while a similar offset 27 extends inwardly from the ear 25, the offsets forming stops to limit the movement of the tilting platform. The offsets 26—27 extend between the side members of the frame and engage against the upper portions of the side members when the platform is tilted into the position shown by dotted lines in Fig. 1, and thus limit the movement of the platform, as will be obvious. By this simple arrangement when a mouse of other animal passes upon the platform 23 to reach the bait, when it passes the pivotal point 19 the weight of the animal will tilt the platform into the position shown in dotted lines in Fig. 1 and thus plunge the animal into the receptacle 11, and when the weight of the animal is removed from the platform the latter immediately returns to its former position, and thus automatically resets the trap. The bait 22 can be located at a sufficient distance above the tilting platform to prevent the animal from reaching it, as it is not necessary to the operation of the trap that the bait shall be reached by the animal. Thus the same bait may be employed for trapping any number of the animals.

The improved device is simple in construction, is manufactured wholly of metal, and may be of any required size and designed for trapping animals of different sizes, but as before stated is designed more particularly for trapping mice and similar small animals. The trap being wholly of metal, can be readily cleansed and thus maintained in sanitary condition. The member 19—20—21 is rotatable in the coils 15—16 so that the arm 21 may be turned backward in parallel relations to the frame and the tilting platform, so that the trap occupies a comparatively small space when not in use. This is an important feature of the invention especially when the traps are being shipped or stored.

What is claimed is:—

1. An animal trap comprising a supporting frame including oppositely arranged bearings, a wire member mounted for rotation in said bearings and extended at one end into a bait arm a plate having depending perforated ears engaged by said wire member and inwardly directed stops operating to limit the movement of said platform.

2. An animal trap comprising a supporting frame including oppositely arranged bearings, a wire member mounted for rotation in said bearings and extended at one end into a bait arm a plate having depending perforated ears engaged by said wire member and inwardly directed stops carried by said ears and extending into position to engage said frame and operating to limit the movement of said platform.

In testimony whereof, I affix my signature, in presence of two witnesses.

LOUIS N. LARSON.

Witnesses:
  W. F. BAKER,
  MABEL D. AUCHMOODY.